United States Patent [19]

Lara et al.

[11] Patent Number: 5,029,614
[45] Date of Patent: Jul. 9, 1991

[54] TANDEM SEAL SYSTEM FOR TESTING PIPELINES

[75] Inventors: Pedro F. Lara, Colombia; Steven G. Petermann, Plano, both of Tex.

[73] Assignee: Atlantic Richfield Company, Los Angeles, Calif.

[21] Appl. No.: 326,204

[22] Filed: Mar. 20, 1989

[51] Int. Cl.⁵ ............................................. F16L 55/10
[52] U.S. Cl. ........................................ 138/90; 138/89; 73/40.5 R; 73/49.6; 73/49.8
[58] Field of Search ................. 138/89, 90, 93; 73/40, 73/40.5 R, 49.1, 49.6, 49.8

[56] References Cited

U.S. PATENT DOCUMENTS

| 2,786,489 | 3/1957 | Morrill | 138/89 |
| 3,561,490 | 2/1971 | Little | 138/90 |
| 3,593,749 | 7/1971 | Reardon | 138/93 |
| 3,902,528 | 9/1975 | Tartabini et al. | 138/93 |
| 4,077,435 | 3/1978 | Van Scoy | 138/89 |
| 4,332,277 | 6/1982 | Adkins et al. | 138/89 |
| 4,465,104 | 8/1984 | Wittman et al. | 138/89 |

FOREIGN PATENT DOCUMENTS 2203214 10/1988 United Kingdom ................. 138/93

*Primary Examiner*—James E. Bryant, III
*Attorney, Agent, or Firm*—Michael E. Martin

[57] ABSTRACT

A traveling seal system for blocking a predetermined section of fluid transmission pipeline for repair or modification or for pressure testing the pipeline includes two seal devices which are interconnected by a flexible cable and are supported for traversal through a pipeline by spaced apart resilient support members supporting respective body members. Each of the seal devices includes radially extensible brake pads which are actuated by annular pistons slidable on the body of the seal devices, respectively, and are disposed in annular pressure chambers formed by the body. Each of the seal devices includes an onboard hydraulic pump for actuating the brake pads between extended and retracted positions and at least one of the seal devices includes an onboard pump for pumping pressure fluid into the space between the seal devices. The space to be isolated or tested is sealed off from the remainder of the pipeline by valves which may comprise passages formed in the seal device bodies and closure members which are skirt portions of at least one of the annular brake pad actuating pistons. The seal system may be remotely controlled through a radio transmitter/receiver for controlling operation of the hydraulic pumps and transmitting operating data from the pipeline.

24 Claims, 3 Drawing Sheets

TANDEM SEAL SYSTEM FOR TESTING PIPELINES

BACKGROUND OF THE INVENTION

1. Field of the Invention

The present invention pertains to a system for traversal through a fluid transmission pipeline for providing a selected isolated or sealed space within a section of the pipeline and for pressure testing the pipe section which defines the sealed space.

2. Background

Fluid transmission pipelines occasionally require modification or repair as well as periodic pressure testing to inspect the structural integrity of the pipe or to locate suspected leaks. Examples of prior art pipeline testing apparatus comprise the devices described in U.S. Pat. Nos. 3,483,895 to Barto, 3,690,348 to Patterson, 3,834,422 to Larson and 4,602,659 to Parkyn. The devices described in all but the Larson patent require the use of two unconnected devices for isolating a section of pipeline for pressure testing or the device must be used in conjunction with a pipeline valve at a particular location which already exists in the pipeline to isolate the test section. In this latter instance, a significantly long section of pipe may be required to be pressurized for the test procedure and the complexity of using two separate line blocking "valves" as described in these references is difficult to manage in many instances.

One approach to overcoming the problems remaining unsolved by prior art apparatus is described in a U.S. patent application entitled: "Apparatus For Pressure Testing Pipelines", Ser. No. 07/253,781, Filed Oct. 5, 1988 in the name of Lloyd A. Baillie and assigned to the assignee of the present invention. Although the device described in the aforementioned patent application presents a unique solution to isolating a relatively modest length of pipeline section to be pressure tested, there are instances wherein the curvature of the pipeline or the section length is unsuitable for the accordion or bellows type structure of the Baillie device.

Accordingly, there has been a need to provide an improved seal system for isolating a section of pipeline of selected length for modification or repair and for pressure testing that section by seal devices which are remotely controllable and which are operable to be used in tandem and connected to each other so that a defined section of pipe is isolated. It has also been deemed desirable to provide a pipeline pressure test system which does not require the use of an existing pipeline valve and which may be remotely controlled to pressurize the pipeline section in question, relieve pressure from that section upon completion of the test and reposition the means effecting sealing of the pipeline to a new section for testing.

SUMMARY OF THE INVENTION

The present invention provides an improved seal system for sealing a section of fluid transmission pipeline for repair or modification or for pressure testing said section of pipeline.

In accordance with one aspect of the present invention, a pair of tandem and interconnected seal devices are operable to be traversed through a fluid transmission pipeline under the urging of fluid flow in the pipeline, positioned in a predetermined section of pipeline and actuated to seal off said predetermined section of pipeline to be pressure tested. The seal system is operable to be placed in position to isolate the selected section of pipeline, actuated by remote control to isolate the section to be tested, pressurize the section to be tested, depressurize the section after completion of the test and moved to a new location in the pipe in a reliable manner.

In accordance with another important aspect of the present invention, a tandem seal system is provided for isolating a section of fluid transmission pipeline for repair or modification or for pressure testing said section which includes spaced apart seal apparatus having brake members which are operable by remote control to be actuated to connect each apparatus forcibly with the pipe wall to overcome pressure forces tending to propel the apparatus through the pipe and valve means for controlling the flow of fluid through the pipe including the section to be tested. In accordance with yet another aspect of the invention, pipeline seal apparatus is provided wherein a seal brake actuating mechanism and pipeline fluid flow shut off valves are actuated simultaneously by interrelated mechanism.

In accordance with still a further aspect of the present invention, a seal system is provided for pressure testing a fluid transmission pipeline which includes one or more seal apparatus or devices having onboard hydraulic pump means for actuating the seal device to be stopped at a predetermined point in a pipeline to hydraulically isolate a section of pipe from other portions of the pipeline, to pressurize a pipeline section to be tested and to be remotely controlled for such operations. The tandem seal system advantageously carries onboard power supply means operable to provide for carrying out the brake actuating and fluid pumping functions.

Still further, in accordance with the present invention, the tandem seal system comprises an arrangement of spaced apart seal members constructed in a manner similar to so-called pipeline pigs and interconnected by a flexible cable for transmitting control and monitoring signals between devices onboard each of the seal devices and for maintaining a predetermined space between the seal devices while preventing the seal devices from travelling away from each other.

The above-described features and advantages of the present invention together with other superior aspects thereof will be further appreciated by those skilled in the art upon reading the detailed description which follows in conjunction with the drawing.

DESCRIPTION OF A PREFERRED EMBODIMENT

Figure 1:
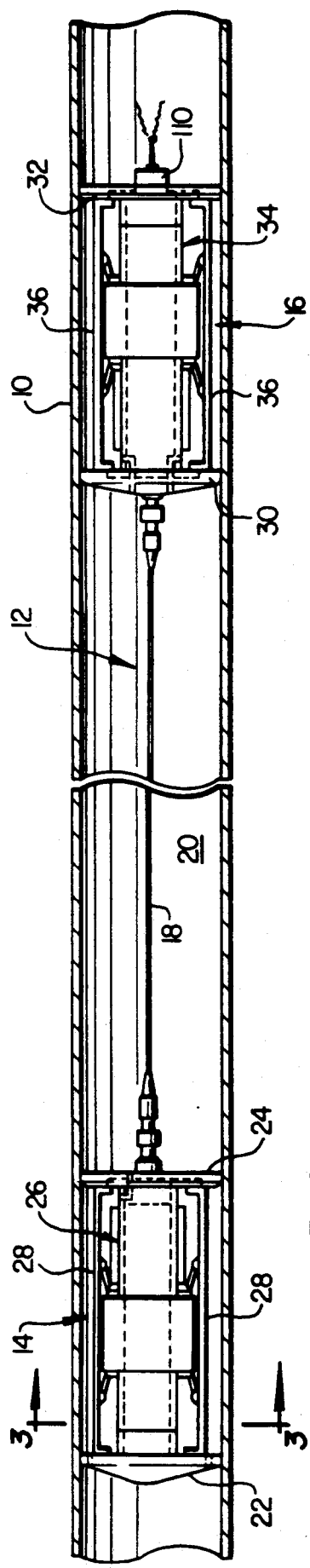
FIG. 1 is a longitudinal section view of a section of fluid transmission pipeline in which the tandem seal system of the present invention is shown disposed and locked for pressurizing a test section of the pipeline.

In the description which follows like parts are marked throughout the specification and drawing with the same reference numerals, respectively. The drawing figures are not necessarily to scale and certain features and elements of the invention are shown in generalized or somewhat schematic form in the interest of clarity and conciseness.

Referring to FIG. 1, there is illustrated a section of fluid transmission pipeline 10 in which a seal system comprising tandem spaced apart seal devices is disposed and is generally designated by the numeral 12. The seal system 12 comprises a leading or forward seal device 14 which is interconnected to a trailing or rear seal device 16 by an elongated flexible cable 18. The cable 18 may be a reinforced wire rope along which are trained separate insulated electrical conductors, all enclosed in an outer jacket or sleeve, not shown. Alternatively, the wire rope may be hollow and the insulated conductors disposed within a central passage. Details of the cable 18 are not illustrated and the cable may take various forms, but it functions to comprise a towing and spacing cable for the seal devices 14 and 16 and also to include suitable multiple electrical conductors or the like for transmitting command and data signals between the seal devices 14 and 16.

Figure 3:
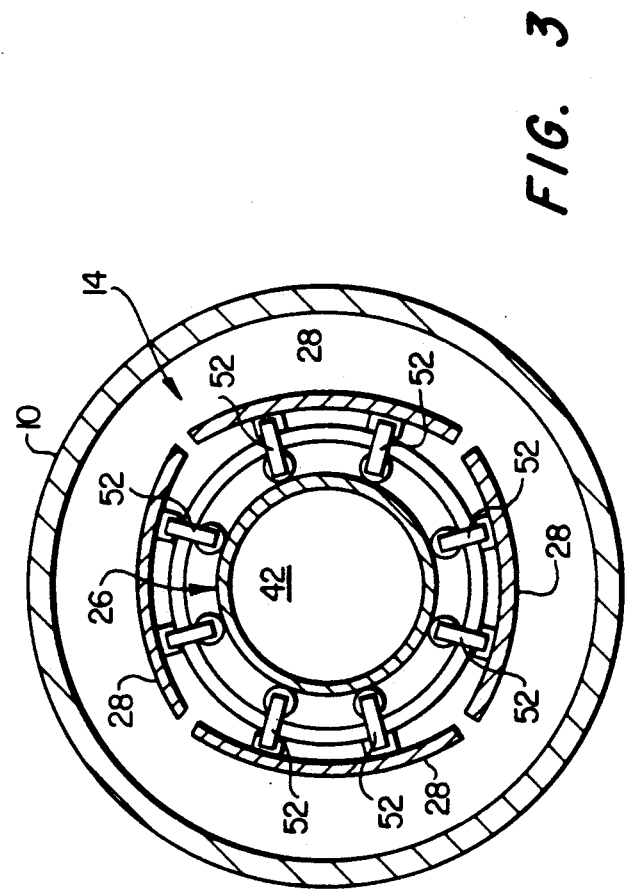
FIG. 3 is a section view taken generally along the line 3—3 of FIG. 1 showing the brake pads retracted.

The seal devices 14 and 16 are operable to isolate a space 20 between the seal devices for pressurization to pressure test the section of pipeline 10 between the seal devices and delimiting the space 20. The seal devices 14 and 16 are of somewhat similar construction and resemble in some respects what are often called pipeline pigs. For example, the seal device 14 includes a generally cylindrical resilient seal and support member 22 forming a nose portion of the seal device 14 and a second resilient and support member 24 spaced aft of the member 22. Each of the members 22 and 24 may be formed of a suitable deformable material such as molded polyurethane. The members 22 and 24 are adapted to support a body 26 which, in turn, supports radially extensible brake or wall gripping pads and support members 28 which are shown in FIGS. 1 and 3 in their retracted position out of gripping engagement of the inner wall of the pipeline section 10. The seal device 16 is constructed in a somewhat similar manner and has forward and aft resilient sealing and support members 30 and 32, respectively, which are adapted to support a body 34 which, in turn, also supports a plurality of radially extensible brake or wall gripping pads 36 adapted for engagement of the inner wall of the pipeline section 10 and also shown in their retracted and non-gripping position in FIG. 1.

Figure 2:
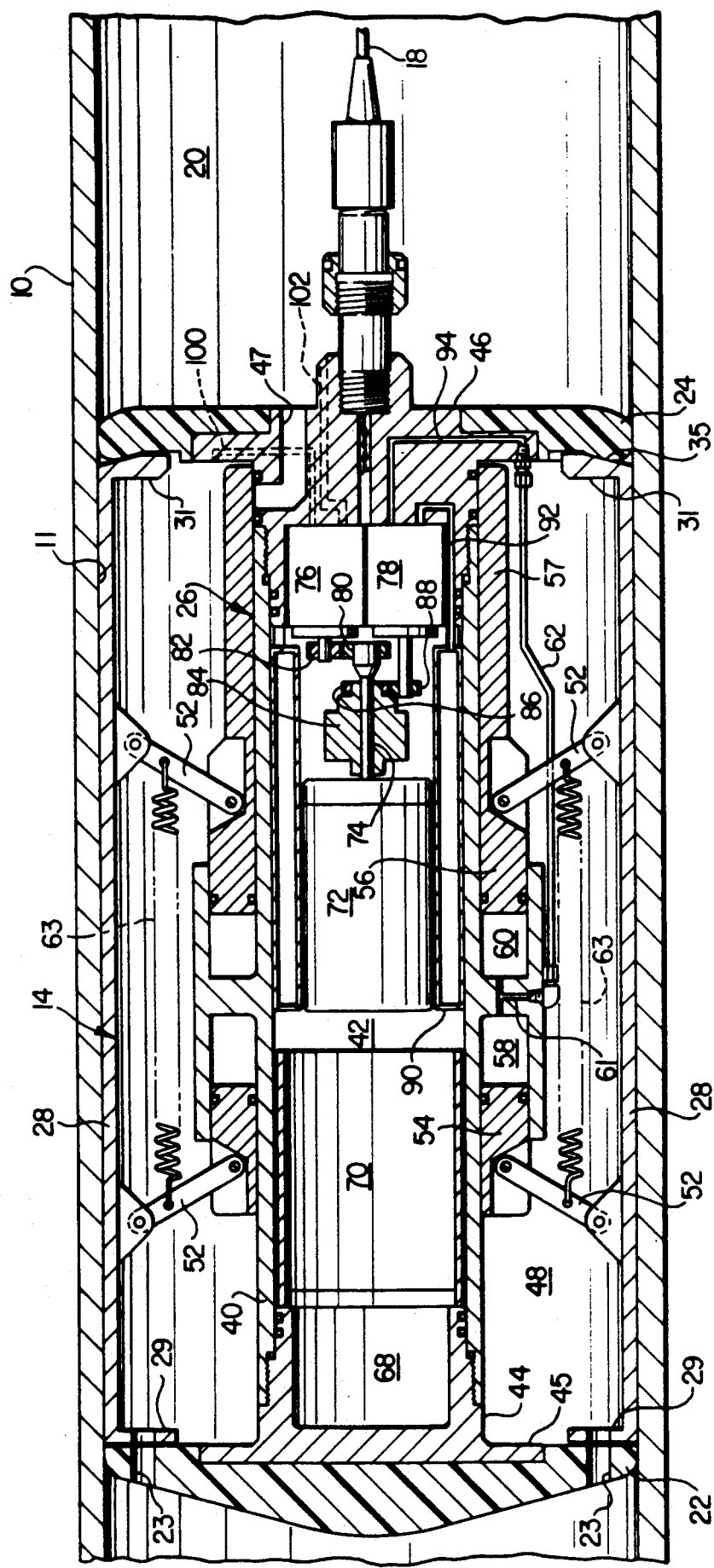
FIG. 2 is a longitudinal central section view of the leading or forward seal device.

Referring now to FIG. 2, the seal device 14 is illustrated in further detail. The body 26 of the seal device includes a generally cylindrical tubular body part 40 which includes an interior space 42 which houses a number of components for operating the seal system 12. The body part 40 is closed at its opposite ends by respective head members 44 and 46, which are suitably connected to the body part 40. The head member 44 includes a circular flange 45 suitably connected to and supported by the support member 22. As illustrated, the support member 22 includes a plurality of axial ports 23 formed therein and opening into an annular space 48 formed between the members 22 and 24 and the body 26.

Each of the brake pads 28 is characterized by a generally circular sector member, see FIG. 3 also, having opposed end flanges 29 and 31 which extend transversely and are disposed directly adjacent the support members 22 and 24, respectively. Each of the brake pads 28 is adapted to be pivotally connected to opposed sets of links 52, see FIG. 3 also, which are respectively, pivotally connected to annular pistons 54 and 56, each of which are disposed for axial sliding movement within opposed chambers 58 and 60 formed in the body part 40. The piston 56 includes an elongated skirt portion 57 extending toward the head member 46 and adapted to cover one or more passages 47, one shown, which are formed in the head member and open to the space 20 in the pipeline section 10. The brake pads 28 are shown in FIG. 2 in their extended position in gripping engagement with the inner wall 11 of the pipeline 10 to prevent movement of the seal device 14 longitudinally through the pipeline.

In response to introducing pressure fluid into the chambers 58 and 60 through a passage 61 and conduit 62, the pistons 54 and 56 are moved axially away from each other to effect radial movement of the brake pads 28 into gripping engagement with the pipe wall 11. In response to relieving fluid pressure in the chambers 58 and 60, plural coil springs 63, which are connected at their opposite ends to the links 52, are operable to move the pistons 54 and 56 toward each other and to effect retraction of the brake pads 28 radially away from the wall 11. FIG. 3 illustrates the brake pads 28 in their alternate or retracted position which they assume when the seal device 14 is being traversed through the pipeline 10.

When the piston 56 is in the aforementioned retracted position, the skirt 57 is disposed axially away from the point where the passages 47 open into the space 48. In this position of the piston 56 pipeline fluid may flow from the space 20 into the space 48 and through the passages 23 into the section of pipeline downstream of the seal device 14, assuming that flow of fluid in the pipeline is from right to left, viewing FIG. 1. Moreover, when the brake pads 28 are in their extended and locked position as illustrated in FIG. 2, the configuration of the flange 31 which has an axially bevelled surface portion 35, as illustrated in FIG. 2, is in supportive relationship to the member 24 whereby axial deflection of the member 24, under the urging of pressure fluid in the space 20, tends to deform the peripheral edge of the member into engagement with the surface 35 and thus, radially outwardly into sealing engagement with the wall surface 11 to form a fluid tight seal for the space 20. Upon retraction of the brake pads 28, the flange 31 moves radially inward but remains in supportive relationship to the seal member 24.

Referring further to FIG. 2, the space 42 of the body part 40 is occupied by a power source comprising batteries 68, suitable housing means for electrical control and instrumentation, generally designated by the numeral 70, and an electric motor 72 having a rotary output shaft 74. The motor 72 is adapted to drive one or more hydraulic pumps 76 and 78 which are drivenly connected to the shaft 74 through reduction gearing 80, 82 for the pump 76 and through a clutch 84 and reduction gearing 86, 88 for the motor 78. The clutch 84 may be selectively controlled to drive the pump 76 continuously or intermittently while the pump 78 is driven at all times when the motor 72 is operating. The clutch 84 may be of a type manufactured by American Precision Industries, Inc. as their Series 15 flange mounted clutch coupling.

The pump motor 72 is surrounded by a generally annular hydraulic fluid reservoir tank 90 which is suitably supported within the body part 40 and is communication with a passage 92 formed in the head member 46 for supplying pressure fluid to the pump 78. The pump 78 includes a discharge port which is in communication with a passage 94 formed in the head member 46 which is connected to the conduit 62 for supplying pressure fluid to the chambers 58 and 60. The pump 78 may be operated in reverse directions whereby the fluid in the reservoir 90 may be pumped to and from the chambers 58 and 60 by direct reversing of the pump. Actuation of the clutch 84 also controls the operation of the pump 76 independently of the pump 78.

The pump 76 includes an inlet port which is in communication with a passage 100 in the head 46 and opening into the space 48. The pump 76 also includes a discharge port in communication with a passage 102 formed in the head 46 and opening into the space 20. Accordingly, when the piston skirt 57, which together with the head member 46 forms a shut-off valve, is in the extended position shown pressure fluid in the space 48 may be pumped into the space 20 to pressurize the space 20 for pressure testing the section of the pipeline 10 between the seal devices 14 and 16.

Figure 4:
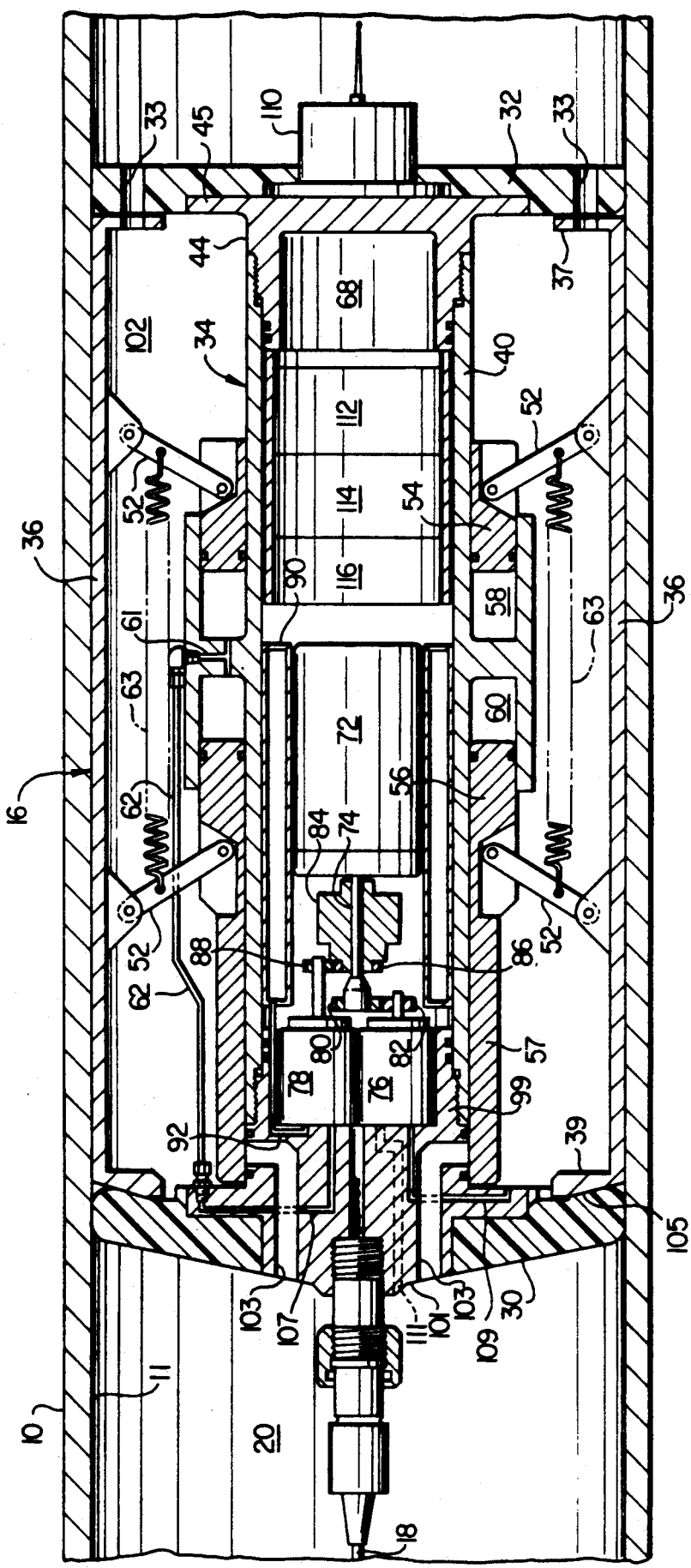
FIG. 4 is a longitudinal central section view of the rear or trailing seal device.

Referring now to FIG. 4, the seal device 16 is provided with several components which are common to both the seal devices 14 and 16. For example, the seal device 16 is also provided with a body part 40, a head member 44 and a head member 99 similar to the head member 46. The resilient seal and support member 32 is adapted to be disposed in supportive relationship to the flange 45 of the head member 44 and includes a plurality of circumferentially spaced openings 33 which open to an annular space 102 disposed between the support members 30 and 32 and the body 34. The support member 30 is also of the molded resilient polyurethane construction and is suitably secured to a hub portion 101 of the head member 99. As further illustrated in FIG. 4, the head member 99 includes passages 103 which are operable to permit the flow of pipeline fluid into the space 20 from the space 102 and, of course, from the pipeline section 10 which is upstream of the seal device 16. The brake pads 36 are essentially identical to the brake pads 28 and are supported for radial displacement between retracted and extended positions by links 52 and annular pistons 54 and 56. The piston skirt 57 is also adapted in the position shown in FIG. 4 to close off the passages 103 so that pressure fluid may not flow between the space 20 and the space 102. The pads 36 include opposed flanges 37 and 39, the latter having an axially sloping or bevelled surface 105 cooperable with the peripheral edge of the support member 30 to provide for wedging engagement with the wall 11 in response to pressure fluid in the space 20.

The seal device 16 also includes a pump drive motor 72 adapted to be drivingly connected to pumps 76 and 78 for providing pressure fluid to pressurize the chamber 20 and for actuating the brake pads, respectively. The clutch 84 is adapted to be controlled to selectively operate the pumps 76 and 78 in the same manner as provided for with respect to the seal device 14. Passages 107, 109 and 111 in the head member 101 correspond to passages 94, 100 and 102 in the head member 46. The components of the seal device 16 which bear the same reference numerals as the components of the seal device 14 operate in the same manner as that previously described for the seal device 14.

The seal device 16 has been modified to also support an FM radio transmitter and receiver unit 110 which is adapted to be supported on the head member 44 for receiving and transmitting the command signals and data signals with respect to the seal system 12. As shown schematically in FIG. 4, the seal device 16 is modified to include a signal decoding unit 112 and a microprocessor 114 operable to convert FM digital radio signals received by the transmitter/receiver 110 to command signals for a pump control unit 116 for controlling the operation of the respective sets of pumps 76 and 78 in the seal devices 14 and 16. The microprocessor 114 is also adapted to receive signals indicating the respective operating conditions of the seal devices 14 and 16, the pressure in the space 20 and the fluid pressure in the spaces in the pipeline section 10 both upstream (to the right viewing FIG. 1) and downstream of the seal system 12 during its operation. Accordingly, the seal system 12 may be remotely controlled to traverse through a fluid transmission pipeline under the urging of fluid being pumped through the pipeline, to be halted at a predetermined location, to provide for actuation of the brake pads 28 and 36 and for operation of the pumps 76 to pressurize the space 20. A typical operating cycle using both seal devices 14 and 16 connected to each other by the cable 18 will now be described.

The seal devices 14 and 16, interconnected by the cable 18, would be launched into a fluid transmission pipeline such as the pipeline 10 through a conventional pipeline pig launching device, not shown. The openings or passages 33 and 103 in the seal device 16 and the passages 47 in the seal device 14 are large enough such that resistance to flow of pipeline fluid would be imposed primarily on the support member 22 with its relatively smaller passages 23 so that the seal system 12 would progress through the pipeline under the urging of fluid being pumped through the pipeline with the seal device 14 acting as a tractor and pulling the seal device 16 by the cable 18. When the seal system 12 approaches the area of interest to be isolated for repair or for pressure testing, pipeline flow would be reduced and the position of the system would be monitored through a suitable position monitoring signal emitted from the transmitter/receiver 110.

At a predetermined position, the seal device 16 would be controlled to extend its brake pads 36 by operation of its pump 78 to extend the pistons 54 and 56 into the positions shown in FIG. 4. Once the brake pads 36 are set in gripping engagement with the inside wall of the pipeline section 10, the pump 78 may be operated to keep a maximum limit pressure in the chambers 58 and 60 through a suitable pressure relieved bypass type closed hydraulic circuit between the reservoir 90 and the pump 78. The clutch 84 may now be actuated to drive the pump 76 of the seal device 16, if desired, to pump fluid from the space 102, which is replenished by fluid from upstream of the seal system 12 (to the right viewing FIG. 1), so that the space 20 is assured to be full of pipeline fluid and the seal device 14 is spaced its prescribed distance from the seal device 16 by taking any slack out of the cable 18.

Once it is assured that the seal devices 14 and 16 are properly spaced, the pump 78 of the seal device 14 is also actuated to extend the brake pads 28 into gripping engagement with the wall of the pipeline section 10. This operation closes off the passages 47 in the head member 46 of the seal device 14 so that the space 20 is essentially closed off from communication with the remainder of the pipeline either upstream or downstream of the seal system 12. The pump 76 of the seal device 16 may then continue to operate to pump fluid from the space 102 into the space 20 to begin raising the pressure of the fluid in that space. The support members 24 and 30 then become resiliently active to be urged against their respective brake pad members to form a fluid tight seal for the space 20 due at least in part to the outward wedging action against the beveled surfaces 35 and 105. The pressure in the space 20 is then increased by the pump 76 of the seal device 16 until the pressure test is completed, all the time monitoring the pressure in the space 20 in accordance with the test objectives. When the test is completed, the pump 76 of the seal device 16 may be reversed or the pump 76 of the seal device 14 may be operated to pump fluid out of the space 20 into the space 48 to relieve the fluid pressure in the space 20. This function may also be accomplished by suitable remote controlled solenoid valves as opposed to operating either of the pumps 76. After reducing the pressure in the space 20, the brake pads 28 and 36 may be retracted by reversing the direction of operation of the pumps 78 to withdraw fluid from the chambers 58 and 60 whereby the springs 63 may urge the brake pads away from gripping engagement with the pipe wall. Pressure fluid pumped into the pipeline section 10 may be used to propel the seal system 12 to a new location or to a receiver or trap section of the pipeline.

Those skilled in the art will recognize that either one of the seal devices 14 or 16 may be operated alone to provide for isolating a section of pipeline for repair, modification or other purposes as well as pressure testing a section of pipelines as long as a line blocking valve or some other line blocking structure is provided to work in conjunction with the seal devices 14 or 16. The seal device 14 would, of course, require to be modified to incorporate its own radio transmitter/receiver unit and accompanying decoding and control unit for its pumps and other control and sensing devices. Moreover, the seal devices 14 and 16 could be each equipped with its own radio transmitter/receiver and accompanying control circuitry as described hereinbefore for the seal device 16, traversed through a section of pipeline independently and independently controlled to be positioned in a selected location in the pipeline to provide an isolated space for pressure testing.

The power requirements for operating the pumps 76 and 78 and the associated control and signal generating circuitry may be carried out utilizing battery packs disposed in each of the head members 44 or elsewhere in the respective housings or bodies 26 and 34. Batteries based on the lithium-thyonial chloride technology would be suitable for providing sufficient power to operate seal devices capable of pressure testing pipelines having a pressure test volume of about at least 100 cubic feet. Power required to raise such a test volume to a pressure 50% above the pipeline operating pressure would be considered attainable.

The seal devices 14 and 16 may be constructed of conventional engineering materials normally utilized for manufacturing so-called pipeline pigs. The cable 18 may be constructed in a manner similar to elongated multiconductor load bearing cables used for downhole well applications and otherwise known as wirelines.

Although a preferred embodiment of a system for pressure testing pipelines has been described in conjunction with the drawing figures herein, those skilled in the art will recognize that various substitutions and modifications may be made to the system and the individual seal devices 14 and 16 without departing from the scope and spirit of the invention as recited in the appended claims.

What is claimed is:

1. A system for isolating a space in a section of fluid transmission pipeline, said system comprising:
   at least one seal device operable to be traversed through said pipeline and positioned in a predetermined location in said pipeline, said seal device including a body, spaced apart support members for supporting said body in said pipeline, resilient seal means for contacting the inside wall of said pipeline to form a substantially fluid tight seal, brake means connected to said body and extensible into gripping engagement with said wall for holding said seal device in a predetermined position in said pipeline, and a first pump on said seal device for pumping pressure fluid in said pipeline into said space to increase the fluid pressure in said space for pressure testing a section of said pipeline delimiting said space.

2. The system set forth in claim 1 wherein:
   said brake means includes a plurality of circumferentially spaced brake pads operably connected to said body and radially extensible between extended and retracted positions for engaging said section of pipeline to prevent the axial displacement of said seal device along said pipeline during pressurization of said space.

3. The system set forth in claim 2 wherein:
   said brake means includes a hydraulic actuator operably connected to said brake pads for moving said brake pads between extended and retracted positions.

4. The system set forth in claim 3 wherein:
   said hydraulic actuator comprises a pair of opposed pistons and said body includes means forming cylinder means for said pistons for defining opposed hydraulic chambers, means connecting said brake pads to said pistons, respectively, and responsive to the displacement of hydraulic fluid into said chambers for actuating said pistons to move said brake pads toward an extended pipe gripping position.

5. The system set forth in claim 4 wherein:
   said brake means includes spring means for moving said brake pads from an extended position toward a retracted position.

6. The system set forth in claim 4 wherein:
   said pistons comprise generally annular sleeves and said body includes means defining opposed annular chambers for receiving said fluid to actuate said pistons to move said brake pads toward said extended position.

7. The system set forth in claim 1 wherein:
   said seal device includes valve means for valving pressure fluid between said space and other space in said pipeline, said valve means including passage in said body and a portion of hydraulic actuator comprising a valve closure member for closing off said passage to block the flow of fluid between said spaces.

8. The system set forth in claim 1 including:
   a second pump on said seal device, hydraulic reservoir adapted to be in communication with said second pump and said second pump being operable for pumping hydraulic fluid to said hydraulic actuator for actuation of said brake pads.

9. The system set forth in claim 8 including:
   motor means for driving each of said pump means, said motor means including a drive shaft, and clutch means interposed between said drive shaft and at least one of said pump means for selectively controlling the operation of said one pump means during operation of said motor means.

10. The system set forth in claim 1 wherein:
said system includes at least a second seal device operable to be spaced from said one seal device and connected thereto by flexible cable to define said seal devices.

11. The system set forth in claim 10 including:
brake means on said second seal device operable to be moved to gripping engagement with said wall.

12. The system set forth in claim 10 including:
valve means on said second seal device for selectively controlling communication of fluid between said space and another space in said section of pipeline.

13. A system for isolating a space in a section of fluid transmission pipeline for increasing the fluid pressure in said space, said system comprising:
a first seal device including a body and seal means for contacting the inside wall of said pipeline to form a substantially fluid tight seal between said space and another portion of the interior of said pipeline;
a second seal device including a body and seal means for contacting the inside wall of said pipeline to form a substantially fluid tight seal, and delimiting with said seal means of said first seal device said space;
means interconnecting said seal devices whereby said seal devices are maintained in a substantially predetermined spaced apart relationship to define the limits of said space as defined by said seal means; and
a pump on at least one of said seal devices for pumping pressure fluid from said pipeline into said space to increase the fluid pressure in said space for pressure testing said pipeline.

14. The system set forth in claim 13 wherein:
at least one of said seal devices includes brake means mounted thereon and extensible into engagement with said wall for holding said system in a predetermined position in said pipeline for pressure testing said section of pipeline delimiting said space.

15. The system set forth in claim 14 wherein:
at least one of said seal devices includes a body and valve means for valving pressure fluid between said space and another portion of said pipeline, said valve means including a passage formed in said body and a closure member for closing off said passage to block the flow of fluid between said space and other portion of said pipeline.

16. The system set forth in claim 15 including:
brake means associated with said one seal device including a brake pad extensible into engagement with said wall for holding said one seal device in a predetermined position in said pipeline and actuator means for moving said brake pad between a retracted position away from said wall and an extended position in engagement with said wall.

17. The system set forth in claim 16 wherein:
said closure member is operably connected to said brake means for movement to close off said passage in response to actuation of said brake means to extend said brake pad into engagement with said wall.

18. The system set forth in claim 14 including:
motor means on at least one of said seal devices for driving said pump to pump pressure fluid between the interior of said pipeline and said space.

19. The system set forth in claim 14 wherein:
said brake means includes a plurality of circumferentially spaced brake pads operably connected to said body and radially extensible between extended and retracted positions for engaging said section of pipeline to prevent the axial displacement of said one seal device along said pipeline during pressurization of said space.

20. The system set forth in claim 19 wherein:
said one seal device includes hydraulic actuator operably connected to said brake pads for moving said brake pads between extended and retracted positions.

21. The system set forth in claim 20 wherein:
said hydraulic actuator comprises a pair of opposed pistons and said body includes means forming cylinder means for said pistons for defining opposed hydraulic chambers, means connecting said brake pads to said pistons, respectively, and responsive to the displacement of hydraulic fluid into said chambers for actuating said pistons to move said brake pads toward an extended position.

22. The system set forth in claim 21 wherein:
both of said seal devices include said brake means.

23. The system set forth in claim 13 wherein:
said means interconnecting said seal devices comprises flexible a cable of predetermined length for defining the length of said space between said seal devices.

24. A system for isolating a space in a section of fluid transmission pipeline, said system comprising:
at least one seal device operable to be traversed though said pipeline and positioned in a predetermined location in said pipeline, said seal device including a body, spaced apart support members for supporting said body in said pipeline, resilient seal means for contacting the inside wall of said pipeline to form a substantially fluid tight seal, brake means connected to said body and extensible into gripping engagement with said wall for holding said seal device in a predetermined position in said pipeline, said brake means including a plurality of circumferentially spaced brake pads and a hydraulic actuator connected to said brake pads for moving said brake pads between extended and retracted positions for engaging said section of pipeline to prevent the axial displacement of said seal device along said pipeline during pressurization of said space and valve means for valving pressure fluid between said space and other space in said pipeline, said valve means including passage in said body and a portion of said hydraulic actuator comprising a valve closure member for closing off said passage means to block the flow of fluid between said spaces and a pump on said at least one seal device for pumping pressure fluid from said pipeline into said space to increase the fluid pressure in said space for pressure testing said pipeline.

* * * * *